(12) United States Patent
Smith

(10) Patent No.: US 10,302,784 B2
(45) Date of Patent: May 28, 2019

(54) SEISMIC-DETECTION SENSOR DEVICE FOR VERTICAL TRANSPORTATION EQUIPMENT

(71) Applicant: Draka Elevator Products, Inc., Rocky Mount, NC (US)

(72) Inventor: Russell Stephen Smith, Boyds, MD (US)

(73) Assignee: Draka Elevator Products, Inc., Rocky Mount, NC (US)

( * ) Notice: Subject to any disclaimer, the term of this patent is extended or adjusted under 35 U.S.C. 154(b) by 934 days.

(21) Appl. No.: 14/608,347

(22) Filed: Jan. 29, 2015

(65) Prior Publication Data

US 2015/0219777 A1    Aug. 6, 2015

Related U.S. Application Data

(60) Provisional application No. 61/937,130, filed on Feb. 7, 2014, provisional application No. 61/934,343, filed on Jan. 31, 2014.

(51) Int. Cl.
| | |
|---|---|
| *B66B 5/02* | (2006.01) |
| *G01V 1/16* | (2006.01) |
| *G01V 1/28* | (2006.01) |
| *G08B 21/10* | (2006.01) |

(52) U.S. Cl.
CPC ............... *G01V 1/28* (2013.01); *B66B 5/022* (2013.01); *G01V 1/16* (2013.01); *G08B 21/10* (2013.01)

(58) Field of Classification Search
CPC ....................................................... G01V 1/28
See application file for complete search history.

(56) References Cited

U.S. PATENT DOCUMENTS

| | | | | |
|---|---|---|---|---|
| 4,038,876 | A * | 8/1977 | Morris | G01C 21/18 33/328 |
| 5,760,696 | A | 6/1998 | Sadri et al. | |
| 5,760,969 | A | 6/1998 | Suzuki | |
| 5,929,767 | A | 7/1999 | Wallick | |
| 6,265,979 | B1 | 7/2001 | Chen et al. | |
| 6,356,204 | B1 * | 3/2002 | Guindi | G01V 1/008 340/665 |
| 6,661,346 | B1 * | 12/2003 | Wood | G01V 1/008 340/601 |

(Continued)

FOREIGN PATENT DOCUMENTS

| | | | |
|---|---|---|---|
| CN | 201130254 Y | * | 10/2008 |
| EP | 2902809 A1 | * | 8/2015 |
| JP | 2009149432 A | * | 7/2009 |
| WO | WO 2009/078655 A2 | * | 6/2009 |
| WO | WO 2011/149974 A1 | * | 12/2011 |

OTHER PUBLICATIONS

Silver Palm Technologies, LLC, "DRK-S701 Operator and Maintenance Manual", DE00XXXX Revision 01, Ijamsville, MD (2013), pp. 1-31.

(Continued)

*Primary Examiner* — Manuel L Barbee
*Assistant Examiner* — Raymond L Nimox
(74) *Attorney, Agent, or Firm* — Additon, Higgins & Pendleton, P.A.

(57) ABSTRACT

A seismic-detection sensor device includes two accelerometers having different sensitivities. The seismic-detection sensor device provides excellent precision and operability monitoring.

19 Claims, 3 Drawing Sheets

(56) References Cited

U.S. PATENT DOCUMENTS

| | | | | |
|---|---|---|---|---|
| 6,883,638 | B1* | 4/2005 | Maxwell | G01D 11/245 181/102 |
| 7,375,646 | B1* | 5/2008 | Diaz-Lopez | G01V 1/008 340/521 |
| 9,086,430 | B2* | 7/2015 | Rice | G01M 5/0066 |
| 9,488,545 | B2* | 11/2016 | Rice | G01M 5/0066 |
| 2003/0214416 | A1* | 11/2003 | Diaz-Lopez | G01V 1/008 340/690 |
| 2004/0105533 | A1* | 6/2004 | Iseli | G01V 1/003 379/106.01 |
| 2010/0042328 | A1* | 2/2010 | Diaz-Lopez | G01V 1/008 702/15 |
| 2010/0161271 | A1* | 6/2010 | Shah | A61B 5/112 702/141 |
| 2011/0187546 | A1* | 8/2011 | Liberman | B60R 21/0132 340/669 |
| 2011/0249530 | A1 | 10/2011 | Liu et al. | |
| 2012/0082002 | A1* | 4/2012 | Iseli | G01V 1/223 367/76 |
| 2012/0277614 | A1* | 11/2012 | Horowitz | A61B 5/0816 600/534 |
| 2013/0130734 | A1* | 5/2013 | Rice | G01M 5/0066 455/517 |
| 2013/0328688 | A1* | 12/2013 | Price | G01V 1/008 340/690 |
| 2014/0187142 | A1* | 7/2014 | Liu | G08B 21/10 455/3.06 |
| 2016/0047708 | A1* | 2/2016 | Rice | G01M 5/0066 702/33 |
| 2017/0184470 | A1* | 6/2017 | Rice | G01M 5/0066 |

OTHER PUBLICATIONS

Silver Palm Technologies, LLC, "DRK-S701 Seismic Detection Sensor", Design Document DR000956 Rev. 04, Ijamsville, MD, US, Nov. 21, 2013, pp. 1-45.

U.S. Appl. No. 61/937,130, filed Feb. 7, 2014, pp. 1-105.

U.S. Appl. No. 61/934,343, filed Jan. 31, 2014, pp. 1-28.

Mohammad et al., "A Review of MEMS Capacitive Sensing Technique and Capacitive Sensor", School of Microelctronic Engineering, University Malaysia Perlis, (no date) pp. 1-5.

Analog Devices, Data sheet ADXL335, Analog Devices, Inc., Norwood, MA, US, (2009) pp. 1-16.

Memsic, Data Sheet MXR9150G/M, Andover, MA, US, Feb. 27, 2007, pp. 1-8.

Weinberg, "Dual Axis, Low g, Fully Integrated Accelerometers", Analog Dialogue 33-1, (1999) pp. 1-2.

Chavez, "Application Considerations for a Switched Capacitor Accelerometer", Freescale Semiconductor, AN1559, Rev. 2, May 2005, pp. 1-4.

Wu et al., "Thermally-Based MEMS Sensors (Part 2)" Gas-Flow: A Critical Technology Comparison of Various Approaches, Commercial Micro Manufacturing International, vol. 6, No. 4, Mar. 2013, pp. 44-48.

Andrejasic, "MEMS Accelerometers", University of Ljubljana, Mar. 2008, pp. 1-17.

Mesa+, "Micromechanical Sensors", downloaded on Jan. 27, 2014 from: www.utwente.nl/ewi/tst/.../el.../mems_sensors.pdf, pp. 1-20.

Memsic, "Accelerometer Fundamentals", AN-00MX-001, downloaded on Jan. 27, 2014 from: http://www.digikey.com/Web%20Export/Supplier%20Content/memsic-1267/pdf/memsic-accelerometer-fundamentals.pdf?redirected=1, pp. 1-7.

Voldman, "Case Study: A Capacitive Accelerometer", Massachusetts Institute of Technology, Lecture 24-3, Spring 2007, pp. 1-44.

Tsuzuki et al., "Oversampling Technique to Improve ADSL345 Output Resolution", Analog Devices, Norwood, MA, US, AN-1063, (2010) pp. 1-2.

Praxis, "Thermal MEMS Accelerometers Fit Many Applications", Sensor Magazin, Mar. 2012, pp. 18-20.

Strand, "Actuation Ranges of ASCE Standard 25-97" downloaded on Jan. 29, 2014, from http://www.strandearthquake.com/prod_seis_GSV/cal_act_ranges.html, pp. 1.

Samuels, "Single-and Dual-Axis Micromachined Accelerometers", Analog Dialogue 30-4 (1996) pp. 3-5.

Chu, "Choosing the Right Type of Accelerometers", Measurement Specialties, Aliso Viejo, CA, USA, (no date) pp. 1-5.

* cited by examiner

SEISMIC-DETECTION SENSOR DEVICE FOR VERTICAL TRANSPORTATION EQUIPMENT

CROSS-REFERENCE TO PRIORITY APPLICATIONS

This U.S. nonprovisional application claims the benefit of expired U.S. Patent Application Ser. No. 61/934,343 for a Seismic Detection Sensor for Vertical Transportation Equipment (filed Jan. 31, 2014) and expired U.S. Patent Application Ser. No. 61/937,130 for a Seismic-Detection Sensor Device for Vertical Transportation Equipment (filed Feb. 7, 2014), each of which is hereby incorporated by reference in its entirety.

FIELD OF THE INVENTION

The present invention relates to vertical transportation safety systems and, more specifically, to a seismic-detection sensor device for elevators and escalators.

BACKGROUND

During earthquakes, buildings typically sustain damage by ground accelerations or subsequent fires and explosions caused by leaking gas (i.e., resulting from broken gas pipelines). Older buildings are particularly susceptible to structural damage caused by ground accelerations, and so seismic sensors are sometimes used to increase the safety of vertical transportation equipment (VTE), such as elevators, in service within such vulnerable buildings. These seismic sensors are intended to detect seismic accelerations exceeding safety guidelines and thereafter safely shut down the VTE. In this regard, U.S. Pat. Nos. 5,760,696, 5,929,767, 6,265,979, and U.S. Patent Application Publication No. U.S. 2011/0249530 are each hereby incorporated by reference in its entirety.

In a conventional seismic unit, an accelerometer typically provides output data (e.g., voltages) that the seismic unit's microcontroller uses to determine the appropriate action in response to a seismic event. An accelerometer, however, may provide inaccurate readings and fail outright, rendering the conventional seismic unit ineffective in response to a seismic event. This can jeopardize the safety and health of building occupants.

SUMMARY

In one aspect, the present invention embraces a seismic-detection sensor device that includes (i) a first accelerometer for detecting acceleration at a relatively high acceleration sensitivity (e.g., ±3 g), (ii) a second accelerometer for detecting acceleration at a relatively low acceleration sensitivity (e.g., ±5 g), and (iii) a processor (e.g., a microcontroller) configured to analyze acceleration information acquired by the first and second accelerometers. In addition, each accelerometer can be a three-axis accelerometer configured to automatically determine the direction of gravity and to automatically align its coordinate system with the direction of gravity.

The present seismic-detection sensor device's use of two accelerometers with different sensitivities helps to prevent false alarms, facilitates the monitoring of an accelerometer's operability, and improves dynamic range to accommodate the unpredictability of both large and small seismic events. As such, the seismic-detection sensor device provides a reliable elevator (or escalator) safety system that provides a low false-alarm rate, is readily adaptable to new environments and different signals, and is highly configurable and compatible with different environments.

The present seismic-detection sensor device possesses particular qualities that are required for installation in modern building structures.

For example, the seismic-detection sensor device can operate reliably. Because immunity to false alarms is vital in the seismic-detection systems, more than one sensor can be used to collect alarm-condition information. In this regard, a seismic-detection sensor device can disregard vibrations from normal building equipment, such as air handlers or motors. Interference from radio frequency (i.e., RFI) or electromagnetic sources (i.e., EMI) does not typically trigger the seismic-detection sensor device. The seismic-detection sensor device precludes vibrations within its sensor housing to facilitate accurate measurement of a building's vibration. Rigid mounting is typically employed so as not to introduce into the seismic-detection sensor device stray vibrations or resonances that could otherwise cause false alarms.

The VTE environment is often space limited, hard to reach, and potentially unsafe for personnel. Therefore, the seismic-detection sensor device is robust and able to operate for extended periods with little or no maintenance. In the event the seismic-detection sensor device fails, it is capable of self-diagnosis and reporting its system error(s). As such, the seismic-detection sensor device can interface with personnel, both locally and remotely.

The seismic-detection sensor device is capable of accommodating various mounting environments. In some embodiments, the seismic-detection sensor device includes an auxiliary sensor head (e.g., a remote sensor) to alleviate the space requirements imposed by the seismic-detection system, especially in extremely confined spaces.

The seismic-detection sensor device is adaptable in its response to seismic signals. For instance, building requirements can change, and so the seismic-detection sensor device is configurable to adapt its alarm-threshold conditions via changeable user-defined profiles that facilitate custom frequency responses.

The seismic-detection sensor device consumes low power and is not prone to failure, but nonetheless includes battery backup power that is sufficient to maintain functionality during and after a power outage and/or a seismic event. If the battery runs down, the seismic-detection sensor device can send signals placing VTE into a fail-safe state.

Finally, the seismic-detection sensor device is expandable to accommodate other modalities, such as detection of fire, water intrusion, combustible gas, wind conditions, air quality, and/or visual monitoring via one or more auxiliary sensors, thereby improving VTE safety. The seismic-detection sensor device is configured (e.g., via software) to facilitate custom integration of these auxiliary sensors with the primary seismic sensor, thereby providing flexible responses to these other modalities.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a seismic-detection sensor device designed for vertical-transportation-equipment (e.g., elevator) control applications. The device is sensitive to motion from seismic events. When the acceleration from a seismic event exceeds recommended levels for safety, such as specified in ASME A17.1 (2013) and ASCE 25-97 (2001), an alarm is triggered and a signal is sent to the elevator to shut down safely and allow for passengers to exit.

Figure 1:
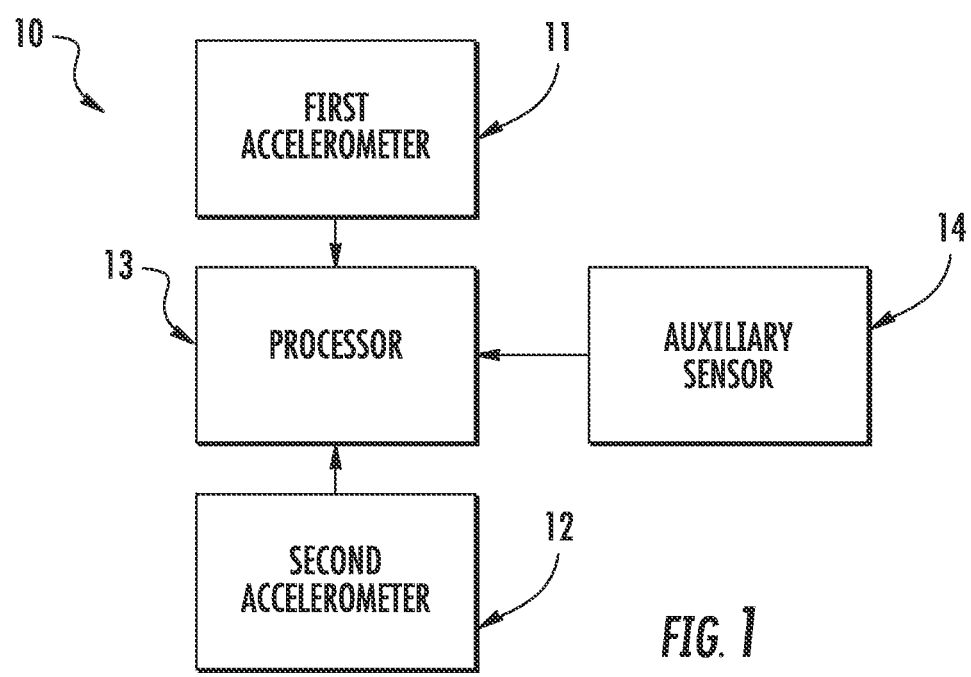
FIG. 1 schematically depicts a block diagram of an exemplary seismic-detection sensor device.

FIG. 1 schematically depicts a block diagram of an exemplary seismic-detection sensor device 10 that includes (i) a first accelerometer 11 for detecting acceleration at a relatively high acceleration sensitivity, (ii) a second accelerometer 12 for detecting acceleration at a relatively low acceleration sensitivity, (iii) a processor 13 configured to analyze acceleration information acquired by the first and second accelerometers 11-12, and (iv) an optional auxiliary sensor 14 to compliment and/or supplement the first and second accelerometers 11-12.

Figure 2:
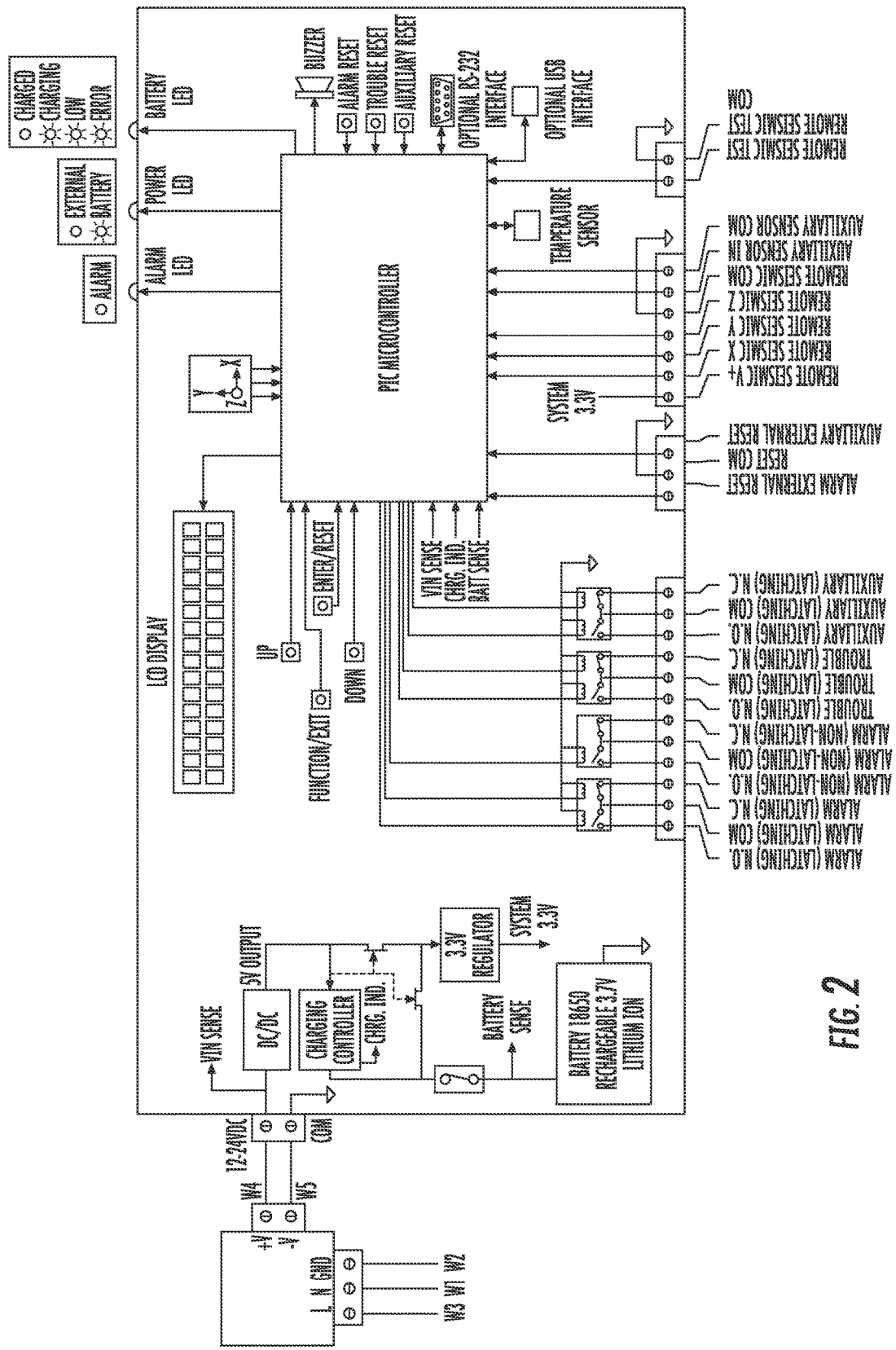
FIG. 2 schematically depicts a block diagram of an exemplary seismic alarm safety system.

FIG. 2 schematically depicts the block diagram of an exemplary seismic alarm safety system as implemented by the seismic-detection sensor device. The seismic alarm safety system includes four main subsystems: (i) a sensor subsystem, (ii) a processing subsystem, (iii) an interface subsystem, and (iv) a power subsystem.

The sensor subsystem typically uses at least one transducer that converts acceleration (e.g., caused by seismic motion) into three analog electronic signals (e.g., voltage signals). The three acceleration-related signals represent the vector components of the direction of acceleration (i.e., the acceleration represented in the accelerometer's x, y, and z coordinate system). The seismic-detection sensor device utilizes two accelerometers with different measurement ranges (i.e., sensitivities). Both accelerometers are typically integrated micro-electro-mechanical systems (i.e., MEMS) and are therefore small, energy-efficient, and easily integrated with other circuit components using conventional circuit fabrication technology. Conceptually, these devices make use of a proof mass that is displaced upon acceleration to the point that a restoring force is able to accelerate the proof mass at the same rate as the device housing (e.g., the device package). The acceleration may be derived by measuring this proof mass displacement.

The requirements for VTE safety in response to seismic events are stipulated in ASME A17.1 Safety Code for Elevators and Escalators (2013) and ASCE Standard 25-97 Seismic Gas Shutoff Valves (2001), each of which is hereby incorporated by reference in its entirety. Both standards specify seismic conditions that must trigger an alarm in a seismic-detection sensor system. In general, the seismic signals that must be detected are characterized by acceleration in the range of about ±2 g and within about a 10 Hz bandwidth.

Accelerometers are rated by the range of acceleration that they can accurately measure (e.g., ±3 g or ±5 g). An accelerometer works best when the amplitude of the acceleration is well matched to the specified range. For example, typical seismic signals are well matched to a ±3 g accelerometer. This is due, in part, to less measurement noise and a more linear response. Because two accelerometers with different sensitivities (e.g., a higher acceleration sensitivity and a lower acceleration sensitivity) are used in the seismic-detection sensor device, the accelerometer with the sensitivity that best matches the acceleration signal may be selected as the active sensor (i.e., the first accelerometer). In other words, large seismic events that might saturate the higher sensitivity accelerometer (e.g., ±3 g) could still be accurately measured by the lower sensitivity accelerometer (e.g., ±5 g). Alternatively, small seismic events that would suffer from noise in the lower sensitivity (e.g., a ±5 g) accelerometer could be measured more accurately by the higher sensitivity accelerometer (e.g., a ±3 g).

The two sets of signals from the two accelerometers can also be used to monitor accelerometer operability. Because each accelerometer should measure the same signals, an error signal indicating a bad accelerometer could be generated when the accelerometers' respective signals fail to match. More generally, the seismic-detection sensor device's processor can analyze the respective acceleration-related signals from the first accelerometer and the second accelerometer to verify the accuracy of the measured acceleration.

The accelerometers are typically integrated into the seismic-detection sensor device's housing (e.g., the accelerometers are on-board accelerometers) but one or both accelerometers may be employed as discrete acceleration sensors communicatively coupled to the seismic-detection sensor device's processor (e.g., one or both accelerometers are remote accelerometers).

In some embodiments of the seismic-detection sensor device, each accelerometer is a three-axis accelerometer configured to automatically determine the direction of gravity and to automatically align its coordinate system with the direction of gravity. This, for example, can simplify installation of the seismic-detection sensor device and eliminate installation errors.

Accelerometers are also rated by the fastest change in acceleration to which they can respond (i.e., the bandwidth). Accelerometers in the seismic-detection sensor device must respond to an acceleration bandwidth of about 10 Hz. This low bandwidth eases the sampling requirements for aliasing when the signal is digitized. When a signal is digitized, the minimum sampling frequency to eliminate aliasing (i.e., the Nyquist frequency) is twice the bandwidth of the signal (i.e., twice its highest frequency), which for seismic signals is about 20 Hz. Over-sampling (i.e., sampling at a rate higher than the Nyquist sampling frequency) can be used to ease the aliasing filter requirements, as well as to reduce noise that could cause false alarms. In the present seismic-detection sensor, a sampling frequency of about 256 Hz can be used to provide satisfactory performance.

The present sensor subsystem is expandable. An auxiliary sensor can be added to the seismic-detection sensor device to compliment and/or supplement on-board accelerometers. This auxiliary sensor can be a remote accelerometer and/or a sensor for detecting an altogether different condition. The auxiliary sensor can be analog or digital. By way of example, the auxiliary sensor might be capable of detecting the presence of water (e.g., water in an elevator-shaft pit) or assessing air quality. It also might have the ability to provide remote video. The potential applications are numerous, including sensing conditions with respect to wind conditions, building sway, combustible gas, and fire.

The seismic-detection sensor device can flexibly accommodate its response to different sensor configurations. For example, during normal operation with no auxiliary sensor present, the detection of a seismic event can cause the seismic-detection sensor device's processor to send signals (e.g., switching signals sent to relays) that cause vertical transportation equipment (e.g., an elevator) to enter into a fail-safe state.

In another configuration, the seismic-detection sensor device's processor can cause the VTE to enter into a fail-safe state when either (i) one or more accelerometers or (ii) an auxiliary sensor (e.g., a building-sway sensor) sends alarm-condition signals, thereby enhancing the seismic-detection sensor device's response to threats.

In an alternative configuration, the seismic-detection sensor device's processor can cause the VTE to enter into a fail-safe state when both (i) one or more accelerometers and (ii) an auxiliary sensor (e.g., a building-sway sensor) send alarm-condition signals, thereby reducing the overall false alarm rate.

In yet another configuration, the auxiliary sensor alarm-condition signals may be acted upon independently and may trigger different responses to the various alarm conditions. Thus, the seismic-detection sensor device has the ability to smartly combine inputs from various sensors (i.e., integrated sensor fusion) in order to make more sophisticated alarm decisions.

The processing subsystem performs all of the computing functions for the seismic-detection sensor. These functions range from detecting alarm conditions to interfacing with users. The processing subsystem may be based around a microcontroller integrated circuit. The subsystem includes an analog-to-digital converter for digitizing analog input signals, memory for storing results, a processor core for computations, and programmable input and output peripherals.

Figure 3:
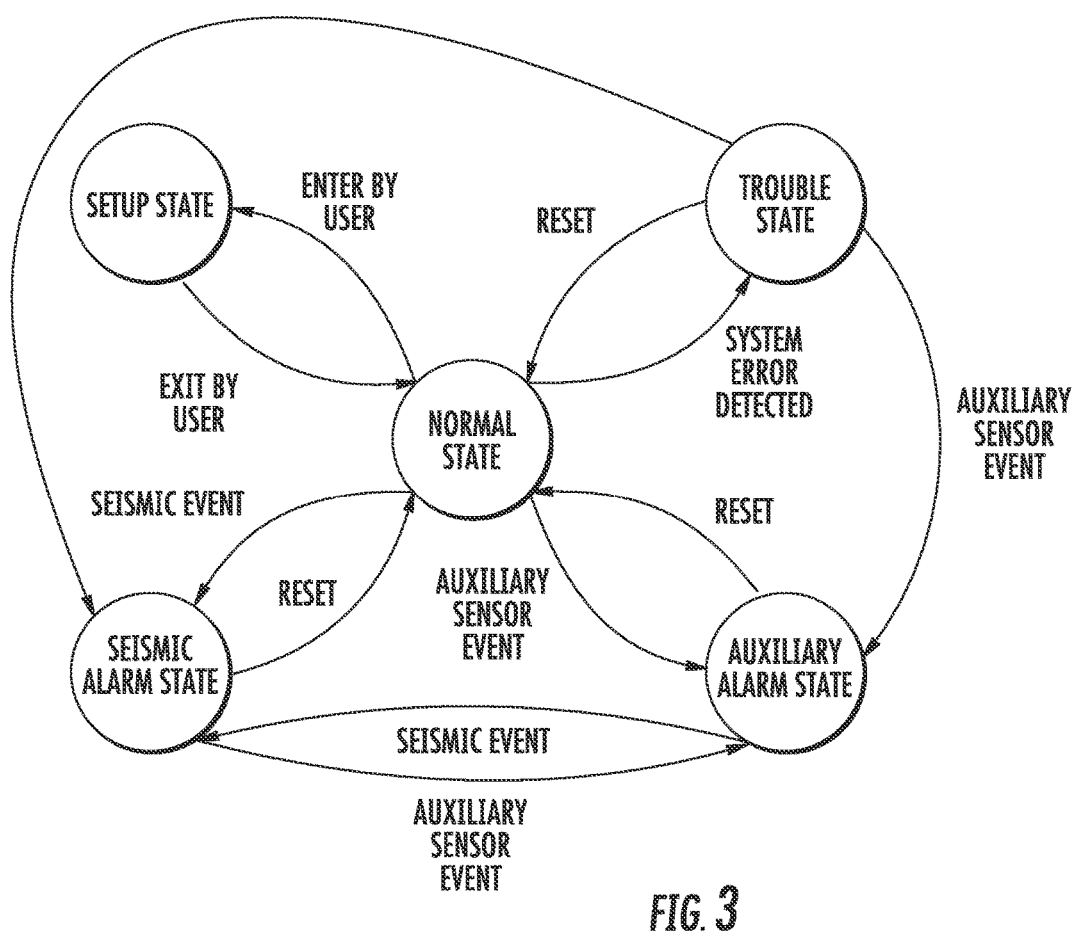
FIG. 3 schematically depicts a state diagram of the seismic alarm safety system.

The seismic-detection sensor device is configured by the microcontroller to behave differently depending on its state. For example, the system may be in one of five states: (i) normal state, (ii) setup state, (iii) trouble state, (iv) seismic alarm state, or (v) auxiliary alarm state. The state diagram is illustrated in FIG. 3.

The normal state is the default state. In this state, the seismic-detection sensor device monitors the accelerometer's output for alarm conditions, runs diagnostics, and supports the user interface. When a seismic event triggers an alarm condition, the unit will enter the seismic alarm state. In this state, the processor will cause vertical transportation equipment to enter into a fail-safe state. This is also true for the auxiliary alarm state. In this auxiliary alarm state, however, a different alarm response may be necessary. For example, if the auxiliary sensor were to detect a combustible gas, then a shut-off valve might be triggered to close. A seismic-detection sensor device in the alarm state can be reset to the normal state via input from the user (e.g., pressing a reset button or closing a remote reset terminal).

The trouble state is entered whenever a system error is detected. This state is entered, for example, when a low-battery level is detected or when the comparison of the two accelerometers' outputs indicates a problem with one accelerometer. In the trouble state, the output signal (e.g., switching signals to the VTE) may change and the source of trouble is indicated.

The seismic-detection sensor device indicates its condition in different ways via the interface subsystem. Indicators such as an LCD display, light emitting diodes, or an audible buzzer may be used. Communication via RS-232 and USB is also available via this subsystem.

The setup state is the state in which the user can set parameters and access system data. This setup state is typically manually entered via a button keypad integrated into the seismic-detection sensor device housing.

The processing subsystem includes an analog-to-digital converter that digitizes the analog signal from the accelerometers and/or auxiliary sensor(s). The digitized set of signals is processed by the processor (e.g., a processor core within a microcontroller) to examine the signals for alarm-condition information. In the case of acceleration, the signals from each accelerometer from each of its respective axes are measured for some duration over a specific frequency range (e.g., 1 Hz to 10 Hz) or subrange(s) within the range. The processor compares the acceleration information with a threshold value (i.e., alarm condition trigger level) derived from safety requirements. If the signal exceeds the threshold, then an alarm state is triggered and the processor sends signals to control the elevator. In the seismic-detection sensor device, a user may select a pre-stored alarm threshold condition or create a custom profile by specifying acceleration-information signal trigger levels within a frequency range (i.e., user-defined threshold conditions for the triggering of a seismic-event alarm).

One exemplary threshold condition (i.e., trigger profile) that comports with ASME A17.1 is seismic activity in the range of F=0-10 Hz, and causing an acceleration >0.15 g. Another exemplary trigger profile is as follows:

F=0.5-1.5 Hz, Acceleration >0.25 g;
F=2.0-3.0 Hz, Acceleration >0.30 g;
F=4.5-5.5 Hz, Acceleration >0.40 g;
F=7.5-8.0 Hz, Acceleration >0.7 g.

In the seismic-detection sensor device, a single value of acceleration over a band of frequencies can be obtained by averaging the acceleration values measured within that band. Considering an exemplary trigger profile (above), an alarm state could be entered if any one of these conditions was met.

Analog accelerometers measure the acceleration in real time. The corresponding acceleration information signal is fed to the processing subsystem where it is digitized and filtered. The processor then converts the time-domain acceleration information signal into its frequency-domain representation before comparing the signal to the alarm threshold condition.

To calculate the acceleration at various frequencies, a Fourier transform is typically implemented. This can be accomplished via a digital implementation of the fast Fourier transform (i.e., FFT). This approach, however, places constraints on the processor and memory. Instead, a Goertzel algorithm can be implemented to obtain the acceleration magnitude at discrete frequencies. This algorithm is computationally efficient, because it only calculates acceleration values for the frequencies of interest (e.g., 0.5 Hz to 10 Hz). It also uses a recursive algorithm that provides results after each iteration, thereby making it faster and freeing up the processor for other tasks. The algorithm can output acceleration values in 0.5 Hz bins in a range such as 0.5 Hz to 10 Hz, which is suitable for seismic applications.

When an alarm condition is met, the processing subsystem uses its programmable peripherals to signal switching relays to turn on or off. These relays interface with external mechanisms for controlling the VTE or other mechanism.

The power subsystem supplies energy to the various circuits and devices. An internal power supply can provide a DC voltage to the seismic-detection sensor device. This power can then be DC-to-DC converted or regulated to levels appropriate for each subsystem. A rechargeable battery can be used in place of the building power and can be recharged via a charging controller circuit within the seismic-detection sensor device. The charging controller maintains the battery at full charge. The battery is used as the primary source of energy if building power is lost or otherwise inoperable. For safety, batteries are typically selected to provide at least 18 hours of operation.

Mechanically, the seismic-detection sensor device is typically fixedly mounted so that the accelerometers are mechanically coupled to the building (i.e., so that building vibrations are transferred substantially completely to the accelerometers). To achieve this coupling, an ABS spacer may be secured (e.g., glued or otherwise secured) to the seismic-detection sensor enclosure (i.e., a housing). A mounting plate is screwed to the other side of the ABS spacer, and the mounting plate is then bolted to the building. This configuration can provide a non-flexible mounting with no significant dampening or resonance in the frequency spectrum of interest, thus making it useful in detecting building acceleration.

This U.S. nonprovisional application incorporates by reference DRK-S701 Operator and Maintenance Manual (2013) and DRK-S701 Seismic Detection Sensor, Design Document (2013), which are provided as Appendix 1 and Appendix 2, respectively, in expired priority U.S. Patent Application Ser. No. 61/937,130.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A seismic-detection sensor device, comprising:
    a first accelerometer for detecting acceleration at a first acceleration sensitivity;
    a second accelerometer for detecting acceleration at a second acceleration sensitivity, wherein the second accelerometer's second acceleration sensitivity is different from the first accelerometer's first acceleration sensitivity; and
    a processor for analyzing acceleration information acquired by the first and second accelerometers to increase the safety of vertical transportation equipment in response to a seismic event,
    wherein the first accelerometer and the second accelerometer are configured to detect acceleration in substantially overlapping magnitude ranges.

2. The seismic-detection sensor device according to claim 1, wherein:
    the first accelerometer and the second accelerometer transmit acceleration related signals to the processor; and
    the processor analyzes the respective acceleration related signals from the first accelerometer and the second accelerometer to verify the operability of the first accelerometer.

3. The seismic-detection sensor device according to claim 1, wherein the first accelerometer and the second accelerometer each detect seismic activity having a magnitude of 0.15 g within a 10 Hz bandwidth.

4. The seismic-detection sensor device according to claim 1, wherein the processor is configured to analyze acceleration information acquired by the first accelerometer and/or the second accelerometer via the Goertzel algorithm.

5. The seismic-detection sensor device according to claim 1, wherein the processor is configured to over-sample the first accelerometer and/or the second accelerometer for acceleration information at a sampling exceeding the Nyquist rate.

6. The seismic-detection sensor device according to claim 1, wherein the first accelerometer and the second accelerometer are micro-electro-mechanical systems (MEMS).

7. The seismic-detection sensor device according to claim 1, wherein the processor is configurable to establish user-defined threshold conditions for the triggering of a seismic-event alarm.

8. The seismic-detection sensor device according to claim 1, wherein the first accelerometer's first acceleration sensitivity is ±3 g, and the second accelerometer's second acceleration sensitivity is ±5 g.

9. The seismic-detection sensor device according to claim 1, comprising an auxiliary sensor configured to detect an alarm condition, wherein the processor is configured to analyze alarm-condition information acquired by the auxiliary sensor.

10. The seismic-detection sensor device according to claim 9, wherein:
    the processor analyzes (i) alarm-condition signals from the first accelerometer and/or the second accelerometer and (ii) an alarm-condition signal from the auxiliary sensor; and
    if the respective alarm conditions (i) and (ii) are triggered, the processor causes vertical transportation equipment to enter a fail-safe state.

11. The seismic-detection sensor device according to claim 9, wherein:
    the processor analyzes (i) alarm-condition signals from the first accelerometer and/or the second accelerometer and (ii) an alarm-condition signal from the auxiliary sensor; and
    if either of the respective alarm conditions (i) or (ii) is triggered, the processor causes vertical transportation equipment to enter a fail-safe state.

12. The seismic-detection sensor device according to claim 1, comprising one or more auxiliary sensors configured to detect fire, water intrusion within an elevator shaft, air quality, combustible gas, wind conditions, and/or visual monitoring, wherein the processor is configured to analyze corresponding fire-related information, water-presence information, air quality information, combustible-gas information, wind-related information, and/or imaging information acquired by the one or more auxiliary sensors.

13. The seismic-detection sensor device according to claim 1, wherein the seismic-detection sensor device further comprises a housing and the first accelerometer and the second accelerometer are fixedly mounted within the housing that itself is fixedly mounted to a building whereby building vibrations are transferred to the first and second accelerometers.

14. A seismic-detection sensor device, comprising:
    a first three-axis accelerometer for detecting acceleration at a first acceleration sensitivity, the first three-axis accelerometer being configured to automatically align its coordinate system with the direction of gravity;
    a second three-axis accelerometer for detecting acceleration at a second acceleration sensitivity, the second three-axis accelerometer being configured to automatically align its coordinate system with the direction of gravity, the first three-axis accelerometer and the second three-axis accelerometer being configured to detect acceleration in substantially overlapping magnitude ranges; and a processor for analyzing acceleration information acquired by the first and second three-axis accelerometers to increase the safety of vertical transportation equipment in response to a seismic event.

15. The seismic-detection sensor device according to claim 14, wherein the second three-axis accelerometer's second acceleration sensitivity is different from the first three-axis accelerometer's first acceleration sensitivity.

16. The seismic-detection sensor device according to claim 14, comprising an auxiliary sensor configured to detect an alarm condition, wherein the processor is configured to analyze alarm-condition information acquired by the auxiliary sensor.

17. The seismic-detection sensor device according to claim 16, wherein:
the processor analyzes (i) alarm-condition signals from the first three-axis accelerometer and/or the second three-axis accelerometer and (ii) an alarm-condition signal from the auxiliary sensor; and
if the respective alarm conditions (i) and (ii) are triggered, the processor causes vertical transportation equipment to enter a fail-safe state.

18. The seismic-detection sensor device according to claim 16, wherein:
the processor analyzes (i) alarm-condition signals from the first three-axis accelerometer and/or the second three-axis accelerometer and (ii) an alarm-condition signal from the auxiliary sensor; and
if either of the respective alarm conditions (i) or (ii) is triggered, the processor causes vertical transportation equipment to enter a fail-safe state.

19. The seismic-detection sensor device according to claim 14, wherein the seismic-detection sensor device further comprises a housing and the first three-axis accelerometer and the second three-axis accelerometer are fixedly mounted within the housing that itself is fixedly mounted to a building whereby building vibrations are transferred to the first and second three-axis accelerometers.

* * * * *